(12) United States Patent
Zhang

(10) Patent No.: US 9,559,992 B2
(45) Date of Patent: Jan. 31, 2017

(54) SYSTEM AND METHOD FOR UPDATING INFORMATION IN AN INSTANT MESSAGING APPLICATION

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 360 days.

(21) Appl. No.: 14/195,766

(22) Filed: Mar. 3, 2014

(65) Prior Publication Data
US 2014/0325391 A1   Oct. 30, 2014

Related U.S. Application Data

(63) Continuation of application No. PCT/CN2013/087932, filed on Nov. 27, 2013.

(30) Foreign Application Priority Data

Apr. 28, 2013   (CN) .......................... 2013 1 0157056

(51) Int. Cl.
| | | |
|---|---|---|
| G06F 3/00 | (2006.01) | |
| H04L 12/58 | (2006.01) | |
| G06F 3/01 | (2006.01) | |

(52) U.S. Cl.
CPC .................................. H04L 51/04 (2013.01)

(58) Field of Classification Search
None
See application file for complete search history.

(56) References Cited

U.S. PATENT DOCUMENTS 8,046,823 B1 * 10/2011 Begen ................... G06F 21/335
                                                    726/12
8,560,401 B1 * 10/2013 Bharara ................. G06Q 30/00
                                                    705/26.1

(Continued)

FOREIGN PATENT DOCUMENTS

| CN | 1992622 A | 7/2007 |
| CN | 101102255 A | 1/2008 |

(Continued)

OTHER PUBLICATIONS

Tencent Technology, ISR, PCT/CN2013/087932, Mar. 6, 2014, 3 pgs.

(Continued)

*Primary Examiner* — Toan Vu
(74) *Attorney, Agent, or Firm* — Morgan, Lewis & Bockius LLP

(57) ABSTRACT

A method is performed by a mobile device having one or more processors and memory for updating information in an instant messenger application installed on the mobile device. The method includes: receiving an instant message from a remote server, the instant message including a first user actionable item; displaying the instant message including the first user actionable item in a graphical user interface corresponding to the instant messenger application; detecting a first user input through the first user actionable item; in accordance with the first user input: generating an information update request; sending the information update request to the remote server; receiving a response to the information update request from the remote server; and updating the instant message in the graphical user interface in accordance with the response from the remote server.

14 Claims, 7 Drawing Sheets

(56) References Cited

U.S. PATENT DOCUMENTS

| | | | |
|---|---|---|---|
| 9,009,067 B1* | 4/2015 | Scotto | G06Q 30/0207 705/15 |
| 2002/0183080 A1* | 12/2002 | Poor | H04L 29/06 455/466 |
| 2006/0075053 A1* | 4/2006 | Xu | H04L 12/581 709/206 |
| 2007/0168863 A1* | 7/2007 | Blattner | G06F 3/011 715/706 |
| 2008/0148156 A1* | 6/2008 | Brewer | G06Q 30/02 715/738 |
| 2009/0089859 A1* | 4/2009 | Cook | H04L 12/585 726/3 |
| 2010/0306044 A1* | 12/2010 | Martin-Cocher | G06Q 30/0242 705/14.41 |
| 2012/0059887 A1* | 3/2012 | Oberle | H04L 51/04 709/206 |
| 2012/0072515 A1* | 3/2012 | Moudy | G06Q 20/382 709/206 |
| 2013/0166433 A1* | 6/2013 | Pechenik | G06Q 10/00 705/37 |
| 2014/0025487 A1* | 1/2014 | Killoran | G06Q 20/12 705/14.49 |

FOREIGN PATENT DOCUMENTS

| | | |
|---|---|---|
| CN | 101447101 A | 6/2009 |
| CN | 101588383 A | 11/2009 |
| WO | WO 2009135418 A1 | 11/2009 |

OTHER PUBLICATIONS

Tencent Technology, Written Opinion, PCT/CN2013/087932, Mar. 6, 2014, 3 pgs.

Tencent Technology, IPRP, PCT/CN2013/087932, Nov. 3, 2015, 4 pgs.

* cited by examiner

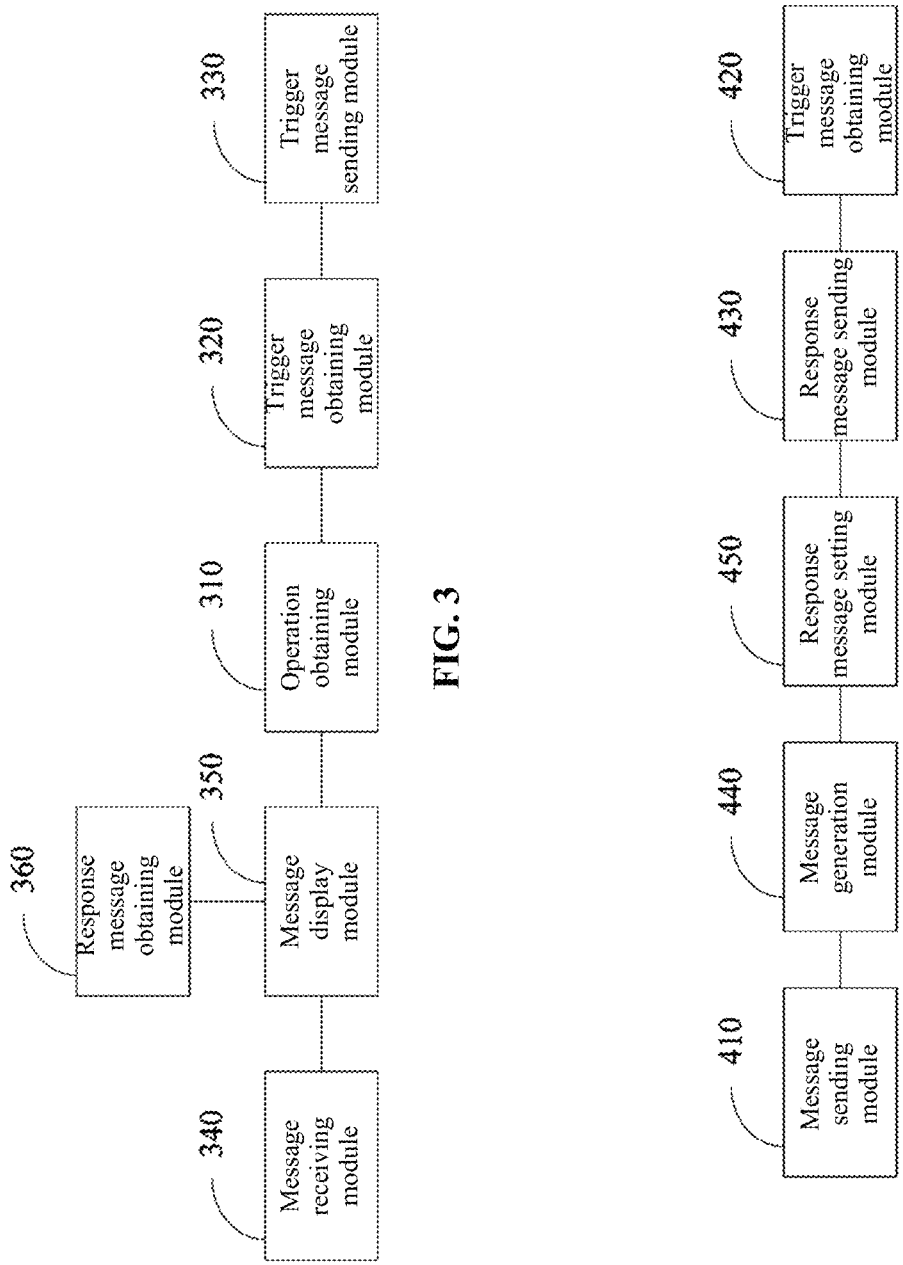

SYSTEM AND METHOD FOR UPDATING INFORMATION IN AN INSTANT MESSAGING APPLICATION

RELATED APPLICATIONS

This application is a continuation application of PCT Patent Application No. PCT/CN2013/087932, entitled "SYSTEM AND METHOD FOR UPDATING INFORMATION IN AN INSTANT MESSAGING APPLICATION" filed Nov. 27, 2013, which claims priority to Chinese Patent Application No. 201310157056.3, "AN INSTANT MESSAGING METHOD, TERMINAL, AND SYSTEM," filed Apr. 28, 2013, both of which are hereby incorporated by reference in their entirety.

FIELD OF THE INVENTION

The present disclosure relates to the communication field, especially relates to a method, terminal and system for instant messenger.

BACKGROUND OF THE INVENTION

Instant Messenger (short for IM) refers to an application that can instantly send and receive the Internet messages, etc. With the development of the Internet technology, Instant Messenger is no longer a simple chat tool, Instant Messenger's function becomes increasingly abundant and is gradually integrated with numerous functions of email, blog, music, TV, game and search function, it has been developed to be an integrated information platform integrating communication, information, entertainment, search, e-commerce, office collaboration and enterprise customer service, etc. With the development of mobile Internet, Internet Instant Messenger becomes mobile too. At present, all the important Instant Messenger providers offer the businesses that access the Internet Instant Messenger through the mobile terminal, the user can send and receive the messages through the mobile terminals equipped with the corresponding client-side software, such as cell phone, tablets, vehicle terminal, etc.

The conventional IM message only supports the receiver to do the basic reading and view, two sides of Instant Messenger can interact with each other only through the function option that each client-side or the session interface of Instant Messenger carries, however, the function that the session interface of Instant Messenger carries is often restricted because of display screen size of mobile terminal, the function options that the client-side with different types or different version carries are also usually different, it is inconvenient for the interaction between two sides of Instant Messenger.

SUMMARY

The above deficiencies and other problems associated with the conventional approach of exchanging information between different servers using an instant messenger are reduced or eliminated by the present disclosure disclosed below. In some embodiments, the present disclosure is implemented in a mobile device (e.g., a smartphone or a tablet computer) that has one or more processors, memory and one or more modules, programs or sets of instructions stored in the memory for performing multiple functions. Instructions for performing these functions may be included in a computer program product configured for execution by one or more processors.

One aspect of the present disclosure involves a computer-implemented method performed by a mobile device having one or more processors and memory for updating information in an instant messenger application installed on the mobile device. The computer-implemented method includes: receiving an instant message from a remote server, the instant message including a first user actionable item; displaying the instant message including the first user actionable item in a graphical user interface corresponding to the instant messenger application; detecting a first user input through the first user actionable item; in accordance with the first user input: generating an information update request; sending the information update request to the remote server; receiving a response to the information update request from the remote server; and updating the instant message in the graphical user interface in accordance with the response from the remote server.

Another aspect of the present disclosure involves a mobile device. The mobile device includes memory, one or more processors, and one or more programs stored in the memory and configured for execution by the one or more processors. The one or more programs include instructions for: receiving an instant message from a remote server, the instant message including a first user actionable item; displaying the instant message including the first user actionable item in a graphical user interface corresponding to the instant messenger application; detecting a first user input through the first user actionable item; in accordance with the first user input: generating an information update request; sending the information update request to the remote server; receiving a response to the information update request from the remote server; and updating the instant message in the graphical user interface in accordance with the response from the remote server.

Another aspect of the present disclosure involves a non-transitory computer readable storage medium having stored therein one or more programs for execution by one or more processors of a mobile device, the one or more programs including instructions for: receiving an instant message from a remote server, the instant message including a first user actionable item; displaying the instant message including the first user actionable item in a graphical user interface corresponding to the instant messenger application; detecting a first user input through the first user actionable item; in accordance with the first user input: generating an information update request; sending the information update request to the remote server; receiving a response to the information update request from the remote server; and updating the instant message in the graphical user interface in accordance with the response from the remote server.

BRIEF DESCRIPTION OF THE DRAWINGS

The aforementioned features and advantages of the present disclosure as well as additional features and advantages thereof will be more clearly understood hereinafter as a result of a detailed description of preferred embodiments when taken in conjunction with the drawings.

FIG. 3 is a schematic block diagram of an IM terminal according to some embodiments of the present disclosure;

FIG. 4 is another schematic block diagram of an IM terminal according to some embodiments of the present disclosure;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments. Note that terms like "IM message" and "instant message" are used interchangeably in this application. Similarly, terms like "IM application," "instant messenger," and "instant messaging application" are used interchangeably in this application. Depending on the context, they may refer to the program located on the server side or the program located on the client side (e.g., an app installed on the smartphone).

In the following, combined with the attached drawings of the embodiment of the present disclosure, the technical scheme of the embodiment of the present disclosure will be described clearly and entirely. Note that the described embodiments are only some of the embodiments, not all of them. Based on the embodiments of the present disclosure, all the other embodiments obtained by the common technicians without any creative labor belong to the protective scope of the present disclosure.

IM method in the embodiments of the present disclosure can be realized in an IM terminal, which may include: terminal devices such as PC (Personal Computer), tablets, cell phone, smart phone, laptop, etc, also may include client-side module of the aforementioned terminal device, for example: IM application client-side, etc. After IM terminal logs in with IM account, it can communicate with other IM terminal or background server, it can pre-establish mutual associated relationship between login accounts of IM terminal that communicates with each other, the associated accounts may include but not limit to associated relationship, such as mutual friends, follow or be followed, subscribe or be subscribed, etc., in the IM interactive process of embodiment of the present disclosure, IM terminal and its login account can be the only correspondence, so adopting the first IM terminal and second IM terminal can indicate that it logs in the IM terminal of the corresponding account, respectively.

Figure 1:
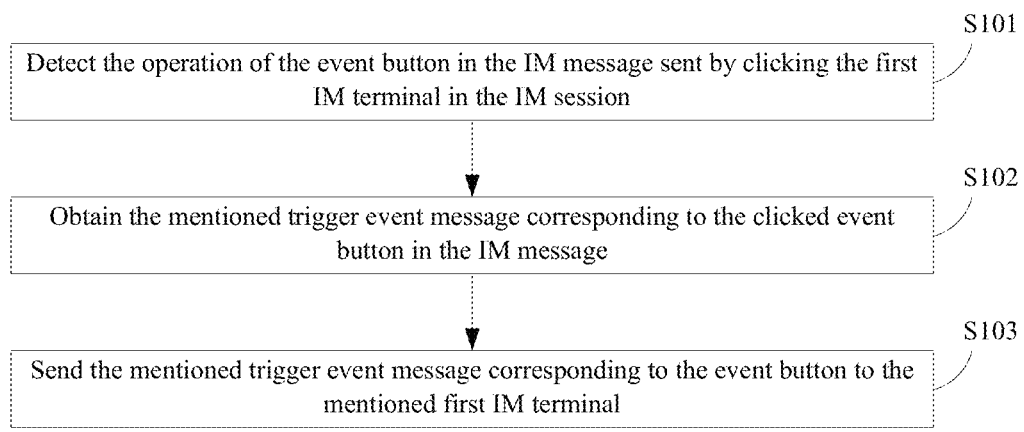
FIG. 1 is a flowchart of an IM method according to some embodiments of the present disclosure.

FIG. 1 is a flowchart of an IM method according to some embodiments of the present disclosure. As described below in connection with FIGS. 6 and 7, this IM method may be performed by an IM terminal or a server computer. This method process may include the following steps:

S101, detect the operation of clicking the event button in the IM message that the first IM terminal sends during the IM session with the first IM terminal. Specifically, it can display the IM message carrying the event button in IM session interface shown in FIGS. 5A to 5C, display the event button in the message box which displays the IM message carrying the event button, IM terminal can receive the operation that the users click the event button by input devices as touch-screen, mouse, etc.

S102, obtain the trigger event message corresponding to the clicked event button in the mentioned IM message. Specifically, the mentioned IM message carrying the event button may include at least one event button and trigger event message corresponding to each event button, the following takes the example of information content that a typical IM message carrying the event button contains:

Title (message title);
Des (message abstract);
Picture (message attached drawing);
URL (message link URL);
button list: (event button information list)
button 1
name: (name of the first event button)
key: b1 (trigger event message is b1);
button 2
name: (name of the second event button)
key: b2 (trigger event message is b2); . . .

Upon receiving the user's click on the second event button of this IM message, the IM terminal may search from this IM message and obtain the trigger event message corresponding to the second event button (As for b2). Optionally, the mentioned IM message carrying the event button can also include the display information of each event button, such as the button displaying pictures, the display state control parameters, etc. IM terminal can display the event button in IM session interface according to the display information of the event button.

S103, send the mentioned trigger event message corresponding to the event button to the mentioned first IM terminal. Specifically, it can send the trigger event message corresponding to the clicked event button that is obtained by searching from this IM message to the mentioned first IM terminal, namely that is the receiver's account of the mentioned IM message carrying the event button. For example, User A sends the IM message carrying the event button to User B, before sending the IM message carrying the event button, User A can set the execution event corresponding to each trigger event message, after receiving the trigger event message that User B sends according to click operation, User A can execute the execution event corresponding to this trigger event message, for example, the event button is the vote button, then it can update the vote statistic data according to the trigger event message of vote button that User B clicks, for another example, the mentioned event button is "Yes" button, then it can plus 1 to this IM message according to the trigger event message of the button that User B clicks, it can also send the preset response message of trigger event message to User B according to the trigger event message of the event button that User B clicks, like return the preset web page, return the preset IM message, or return an event message to change the display state of the mentioned event button of the receiver in IM session, for instance, User B clicks the vote button in IM message, User A can return the response message carrying the current vote statistic data to User B, User B can change the display state of the mentioned event button of the receiver in IM session according to this response message, for example, set the vote button as non click state and shown in gray, or display the mentioned current vote statistic data in button area.

Optionally, the login account of the first IM terminal in this embodiment can be public account, that is all the communication accounts for the medium, departments, enterprises or public figures, it can interact the messages with the public account by the public platform server, for example, User A in the above example is the public account, User B is the private account, then User A can submit the mentioned IM message carrying the event button to the public platform server, the public platform server pushes IM message carrying the event button to the associated user of User A, after receiving the mentioned IM message carrying the event button, User B may submit the trigger event message corresponding to the event button to the public platform server according to the user's operation, the public platform server sends the trigger event message corresponding to the mentioned event button to User A.

Figure 2:
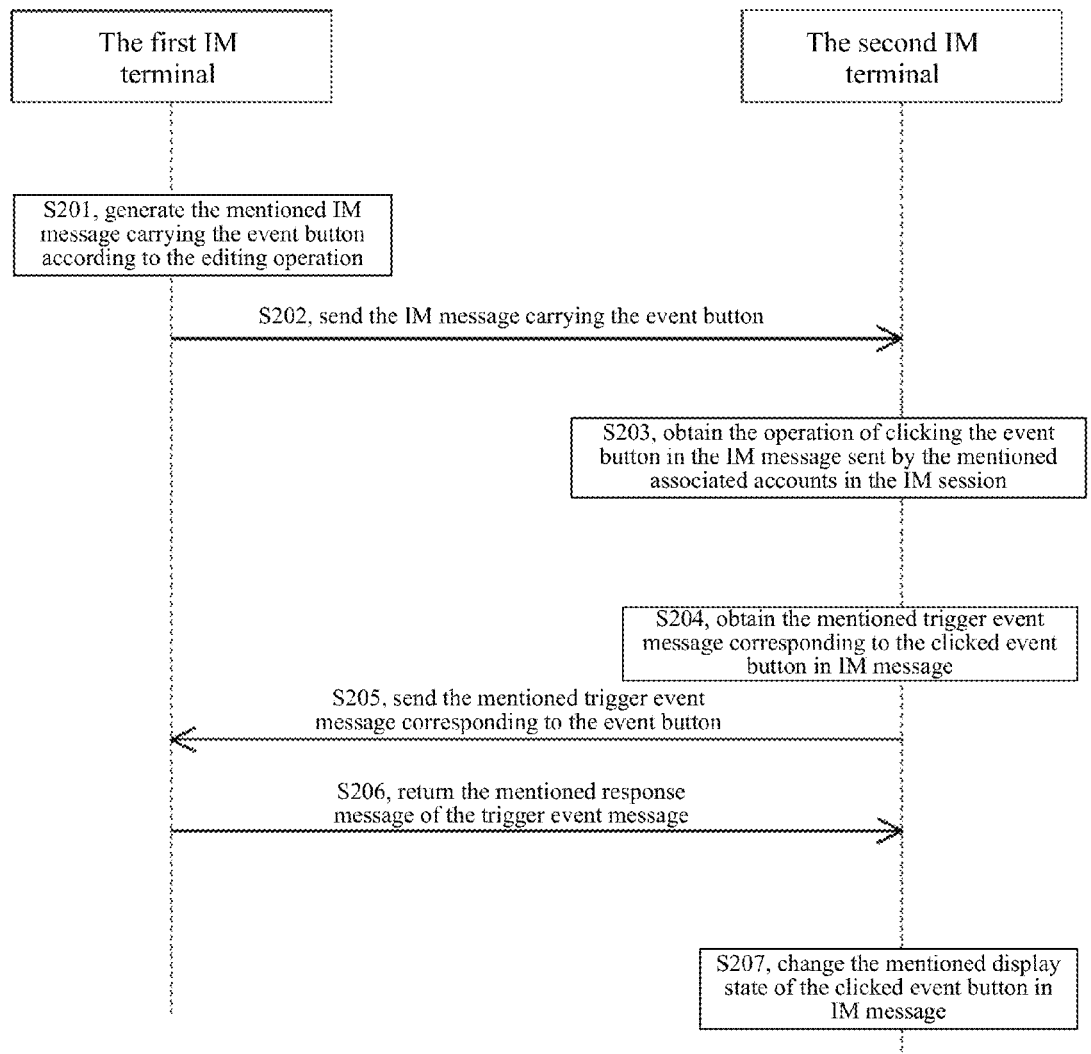
FIG. 2 is another flowchart of an IM method according to some embodiments of the present disclosure.

FIG. 2 is another flowchart of an IM method according to some embodiments of the present disclosure. In this embodiment, it takes an example of IM interaction between a public account and a private account to describe the implementation process of the present disclosure in detail, it needs to point out that applying the same theory can completely realize IM interactive scenes between private accounts, or IM interactive scenes between public accounts, as shown in the figure, the method process in this embodiment may include the following steps:

S201, the first IM terminal generates IM message carrying the event button according to the editing operation. In specific implementation, after the first IM terminal in this embodiment logs in the public account, it can edit, add the content information that generates the IM message carrying the event button according to the message module that background server (such as public platform server) provides, the information content of the mentioned IM message may, as the example in the above S102, include at least one event button and trigger event message corresponding to each event button, optionally, it may also include the display information of each event button, such as button displaying pictures, displaying state control parameters, etc. The first IM terminal can also set the response message respectively corresponding to the trigger event message of each event button when IM message carrying the event button is generated.

S202, the first IM terminal sends the IM message carrying the event button to the second IM terminal. In specific implementation, the first IM terminal can send the IM message carrying the event button through the public platform server, so that makes the mentioned public platform server to send the mentioned IM message carrying the event button to all the associated accounts with the first IM terminal, the login account of the second IM terminal can establish the associated relationship with the public account that the first IM terminal logs in through follow, subscribe or add as the friends or other ways in advance, so as to be able to obtain the IM message carrying the event button that the first IM terminal sends.

Figure 5C:
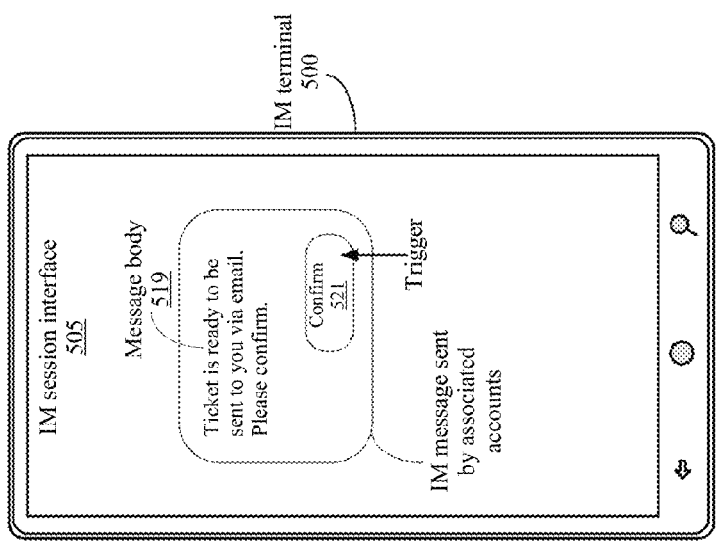
FIGS. 5A-5C are schematic screenshots of how an IM message is updated based on user inputs through buttons displayed in the IM session interface according to some embodiments of the present disclosure.
Figure 5B:
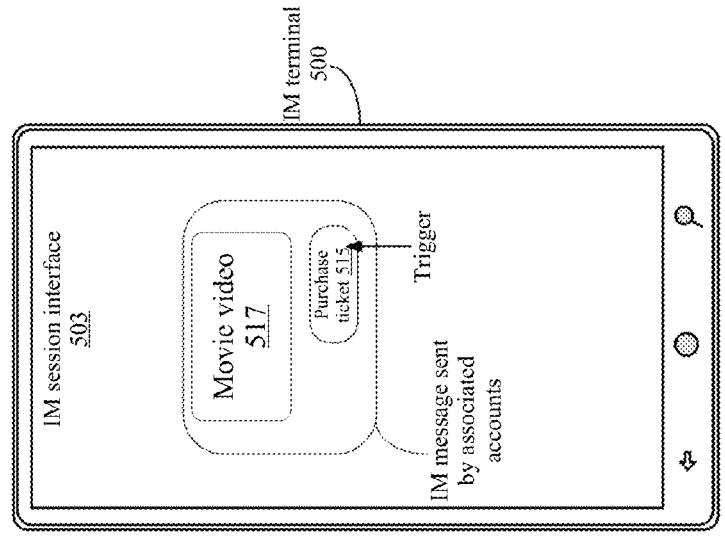
Figure 5A:
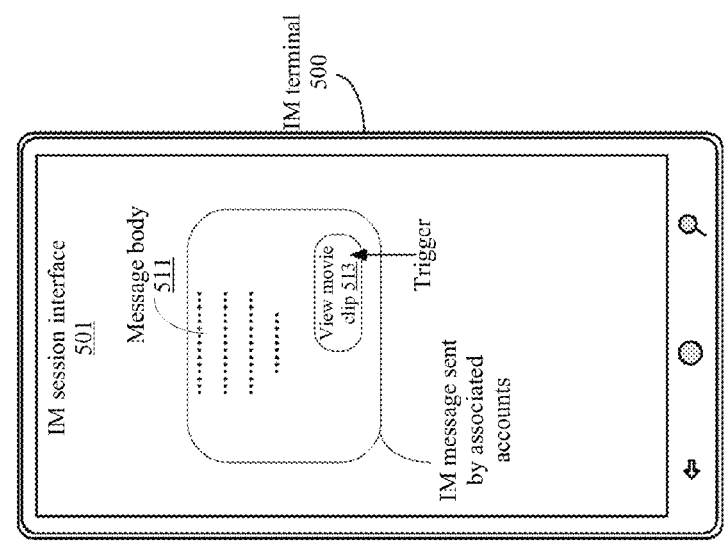

S203, the second IM terminal obtains the operation of clicking the event button in the IM message sent by the mentioned associated accounts in the IM session. Specifically, after the second IM terminal receives the IM message carrying the event button that the first IM terminal sends, it can display the IM message carrying the event button in IM session interface as shown in FIGS. 5A to 5C, display this event button in the message box which displays the IM message carrying the event button, IM terminal can receive the operation that the users click the event button by input devices as touch-screen, mouse, etc.

S204, the second IM terminal obtains the mentioned trigger event message corresponding to the clicked event button in IM message. Specifically, the information content of the mentioned IM message may, as the example in the above S102, include at least one event button and trigger event message corresponding to each event button, the second IM terminal can search the trigger event message corresponding to the event button clicked according to the user's click operation, for example, when it receives the second event button of this IM message that the user clicks, then it can search and obtain the trigger event message b2 corresponding to the second event button from this IM message.

S205, the second IM terminal sends the trigger event message corresponding to the mentioned event button to the first IM terminal.

S206, the first IM terminal sends the response message of the mentioned trigger event message to the second IM terminal. Specifically, the first IM terminal can return the corresponding message to the second IM terminal according to the preset corresponding relationship between response messages and trigger event messages; the first IM terminal can also return the response message to the second IM terminal according to its users' reply operation. In this embodiment, taking the vote button as an example, the IM message carrying the event button sent from the first IM terminal to the second IM terminal is the vote message, including three vote buttons corresponding to A, B and C, the first IM terminal sends the trigger event message b2 corresponding to the B event button to the second IM terminal according to the users' clicking the B event button, after receiving it, the first IM terminal updates the vote statistic data according to the trigger event message to add one to the vote number of B, and return the response message, including the notification message of voting successfully and current vote statistic data to the second IM terminal. In the optional embodiment, the first IM terminal also can set the automatic return response message on the public platform server, for example, it returns the response message of "Successful vote" to the second IM terminal by default.

S207, the second IM terminal changes the display state of the clicked event button in the mentioned IM message according to the response message returned by the first IM terminal according to the mentioned trigger event message. In specific implementation, change the display state of the clicked event button according to the display state control parameters carried by IM message, for example, after receiving the response message, set the vote button as non click state and shown in gray, or display the mentioned current vote statistic data in button area according to the content carried by the response message.

FIG. 3 is a schematic block diagram of an IM terminal according to some embodiments of the present disclosure. In this embodiment, the IM terminal can include:

Operation obtaining module 310, configured to detect the operation of the event button in the IM message sent by clicking the second IM terminal during the IM session with the first IM terminal. In specific implementation, the IM terminal can display the IM message carrying the event button in IM session interface shown in FIGS. 5A to 5C, display the event button in the message box of displaying the IM message carrying the event button, the operation obtaining module 310 can receive the operation that the users click the event button by input devices as touch-screen, mouse, etc.

Trigger message obtaining module 320, configured to obtain the trigger event message corresponding to the clicked event button in the mentioned IM message. Specifically, the information content of the mentioned IM message may, as the example in the above S102, include at least one event button and trigger event message corresponding to each event button, the second IM terminal can search the trigger event message corresponding to the event button clicked according to the user's click operation, for example, when it receives the second event button of this IM message that the user clicks, then it can search and obtain the trigger event message b2 corresponding to the second event button from this IM message.

Trigger message sending module 330, configured to send the mentioned trigger event message corresponding to the event button to the mentioned first IM terminal. Specifically, trigger message sending module 330 can send the trigger event message corresponding to the clicked event button that is obtained by searching from this IM message to the mentioned first IM terminal, namely that is the receiver's account of the mentioned IM message carrying the event button. For example, User A sends the IM message carrying the event button to User B, before sending the IM message carrying the event button, User A can set the execution event corresponding to each trigger event message, after receiving the trigger event message that User B sends according to click operation, User A can execute the execution event corresponding to this trigger event message.

Optionally, the login account of the first IM terminal in this embodiment can be public account, that is all the communication accounts for the medium, department, enterprises or public figures, the IM terminal in this embodiment can interact the messages with the public account through the public platform server, which is that the message sending module 330 is triggered to submit the trigger event message corresponding to the event button to the public platform server, and the public platform server sends the trigger event message corresponding to the mentioned event button to the first IM terminal.

Furthermore, the IM terminal in the embodiment of the present disclosure can also include:

Message receiving module 340, configured to receive the IM message carrying the event button sent by the first IM terminal, the mentioned IM message carrying the event button includes at least one event button and trigger event message corresponding to each event button.

Message display module 350, configured to display the mentioned at least one event button in the mentioned IM message carrying the event button message. Optionally, the mentioned IM message carrying the event button can also include the display information of each event button, such as the button displaying pictures, the display state control parameters, etc. the message display module 350 can display the event button in IM session interface according to the display information of the event button.

Optionally, the mentioned IM terminal can also include:

Response message obtaining module 360, configured to obtain the response message returned by the mentioned first IM terminal according to the mentioned trigger event message. In specific implementation, before the first IM terminal sending the mentioned IM message carrying the event button, the execution event corresponding to each trigger event message can be set, after receiving the trigger event message sent by the IM terminal in this embodiment according to the clicking operation, the first IM terminal can execute the execution event corresponding to the trigger event message, and send the preset response message to the second IM terminal according to the trigger event message of the users' clicking event button of the second IM terminal, for example, return the preset website, return the preset IM message, or return an event message to change the display state of the mentioned event button of the receiver in IM session. After receiving the response message returned by the first IM terminal, the response message obtaining module 360 can inform the message display module 350 of changing the display state of the mentioned event button of the receiver in IM session according to the response message, for example, set the vote button as non click state and shown in gray, or display the mentioned current vote statistic data in button area.

FIG. 4 is another schematic block diagram of an IM terminal according to some embodiments of the present disclosure. As shown in the figure, the IM terminal in the embodiment can include:

Message sending module 410, configured to send the IM message carrying the event button to the second IM terminal. In specific implementation, as shown in the example of the above mentioned S102, the message content of the mentioned IM message can include at least one event button and the trigger event message corresponding to each event button, it can also include the display message of each event button, such as the button displaying pictures, the display state control parameters, etc.

Trigger message obtaining module 420, configured to obtain the trigger event message corresponding to the mentioned event button sent by the mentioned second IM terminal according to the operation of clicking the mentioned event button. In specific implementation, after receiving the mentioned IM message carrying the event button, the second IM terminal can display the IM message carrying the event button in the IM session interface shown in FIGS. 5A to 5C, and display the event button in the message box which display the IM message carrying the event button, the second IM terminal can receive the operation of users' clicking the event button by input devices such as touch-screen, mouse, etc. and then search out the trigger event message corresponding to the clicked event button according to the operation of the users' clicking the mentioned event button, and send the trigger event message corresponding to the mentioned event button to the IM terminal in this embodiment. Optionally, the login account of the IM terminal in this embodiment can be public account, which is all the communication accounts for the medium, department, enterprises or public figures, which can exchange messages with other IM terminals through public platform server.

That is, the mentioned message sending module 410 can be used specifically for sending the mentioned IM message carrying the event button to public platform server to make the public platform server send the mention IM message carrying the event button to the mentioned second IM terminal;

The mentioned trigger message obtaining module 420 can be used specifically for obtaining the trigger event message which is distributed by the public platform server and corresponding to the mentioned event button sent by the mentioned second IM terminal according to the operation of users' clicking the mentioned event button.

Furthermore, the IM terminal in this embodiment can also include:

Message generation module 430, configured to generate the IM message carrying the event button according to the editing operation, the mentioned IM message carrying the event button includes at least one event button and trigger event message corresponding to each event button. In specific implementation, after the first IM terminal logging in public account, the message generation module 430 in this embodiment can generate the IM message carrying the event button according to the message model provided by background server (such as public platform server) by editing and adding the content message, as shown in the example of the above mentioned S102, the message content of the mentioned IM message shall include at least one event button and the trigger event message corresponding to each event button, optionally, it can also include the display message of each event button, such as button displaying pictures, displaying state control parameters, etc.

Furthermore, the IM terminal in this embodiment can also include:

Response message sending module 440, configured to return the response message of the mentioned trigger event message to the mentioned second IM terminal. In specific implementation, the response message sending module 440 can return the corresponding respond message to the second IM terminal according to the preset corresponding relationship between response message and trigger event message, the response message sending module 440 can also return the response message to the second IM terminal according to its users' reply operation. In this embodiment, taking the vote button as an example, the IM message carrying the event button sent by the message sending module 410 is the vote message, including three vote buttons corresponding to A, B and C, the second IM terminal sends the trigger event message b2 corresponding to the B event button according to the users' clicking the B event button, after receiving it, the first IM terminal in this embodiment can update the vote statistic data according to the trigger event message to add one to the vote number of B, the response message sending module 440 can return the response message, including the notification message of voting successfully and current vote statistic data to the second IM terminal.

Furthermore, the IM terminal in this embodiment can also include:

Response message setting module 450, configured to set the response message corresponding to the mentioned trigger event message. In specific implementation, after the message generation module 430 generating the IM message carrying the event button, the response message setting module 450 can set the response messages corresponding to the trigger event messages of each event button separately. The mentioned response message sending module 440 searches the response message corresponding to the trigger event message in response message setting module 450, and send the searched response message corresponding to the trigger event to the second IM terminal. In the optional embodiments, the response message setting module 450 can also set automatically returning response message in public platform server, for example, setting that when receiving the trigger event message corresponding to a certain event button sent by the second IM terminal, the public platform server can return the response message of "successful vote " to the second IM terminal with default.

Figure 6:
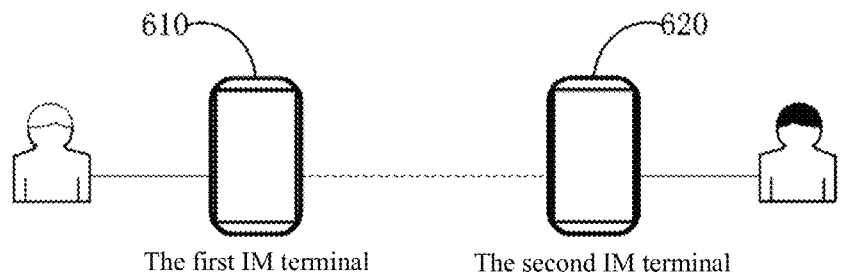
FIG. 6 is a block diagram of an IM system according to some embodiments of the present disclosure.

FIG. 6 is a block diagram of an IM system according to some embodiments of the present disclosure. Note that the methods shown in FIG. 1-FIG. 2 in the embodiment of the present disclosure can be used in the IM system of this embodiment. The mentioned IM system includes the first IM terminal 610 and the second IM terminal 620, among which:

The mentioned first IM terminal 610 is the mentioned IM terminal described by the above mentioned embodiment in reference to FIG. 4, configured to send the IM message carrying the event button to the mentioned second IM terminal 620; obtaining the trigger event message corresponding to the mentioned event button sent by the mentioned second IM terminal 620 according to the operation of clicking the mentioned event button;

The mentioned second IM terminal 620 is the IM terminal described in the above mentioned embodiment in reference to FIG. 3, configured to detect the operation of clicking the event button in the IM message sent by the mentioned associated accounts in the IM session with the first IM terminal 610; obtain the mentioned trigger event message corresponding to the clicked event button in IM message; send the mentioned trigger event message corresponding to the event button to the mentioned first IM terminal 610.

Figure 7:
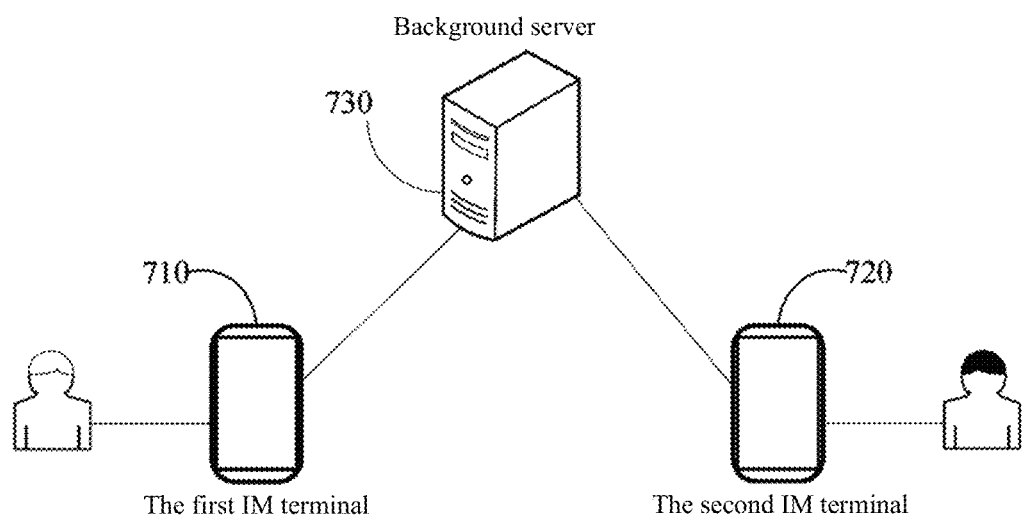
FIG. 7 is another block diagram of an IM system according to some embodiments of the present disclosure.

FIG. 7 is another block diagram of an IM system according to some embodiments of the present disclosure. Note that the method shown in FIG. 1-FIG. 2 in the embodiment of the present disclosure can be used in the IM system of this embodiment. The IM system in this embodiment includes the first IM terminal 710, the second IM terminal 720 and the background server 730, among which:

The mentioned first IM terminal 710 is the mentioned IM terminal described by the above mentioned embodiment in reference to FIG. 4, configured to send the mentioned IM message carrying the event button to public platform server 730, so as to make the mentioned public platform server 730 send the mentioned IM message carrying the event button to the mentioned second IM terminal 720; obtaining the trigger event message which is distributed by the public platform server 730 and corresponding to the mentioned event button sent by the mentioned second IM terminal 720 according to the operation of users' clicking the mentioned event button. In this embodiment, the mentioned login account of the first IM terminal is the public account.

The mentioned second IM terminal 720 is the IM terminal described in the above mentioned embodiment in reference to FIG. 3, configured to detect the operation of clicking the event button in the IM message sent by the mentioned associated accounts in the IM session with the first IM terminal 610; obtain the mentioned trigger event message corresponding to the clicked event button in IM message; send the mentioned trigger event message to public platform server 730 to make the mentioned public platform server 730 send the mentioned trigger event message to the mentioned first IM terminal 710.

The background server 730 is used for transferring the message interaction between the first IM terminal and the second IM terminal. In specific implementation, the mentioned background server can include the public platform server, as well as the IM server, the SNS (Social Networking Services) server, etc.

The embodiment of the present disclosure sends the trigger event message corresponding to the clicked event button to the IM terminal of associated accounts by the operation of clicking the event button in IM message in IM session, realizing a more flexible and general interaction method for IM interaction by expanding the IM message.

Figure 8:
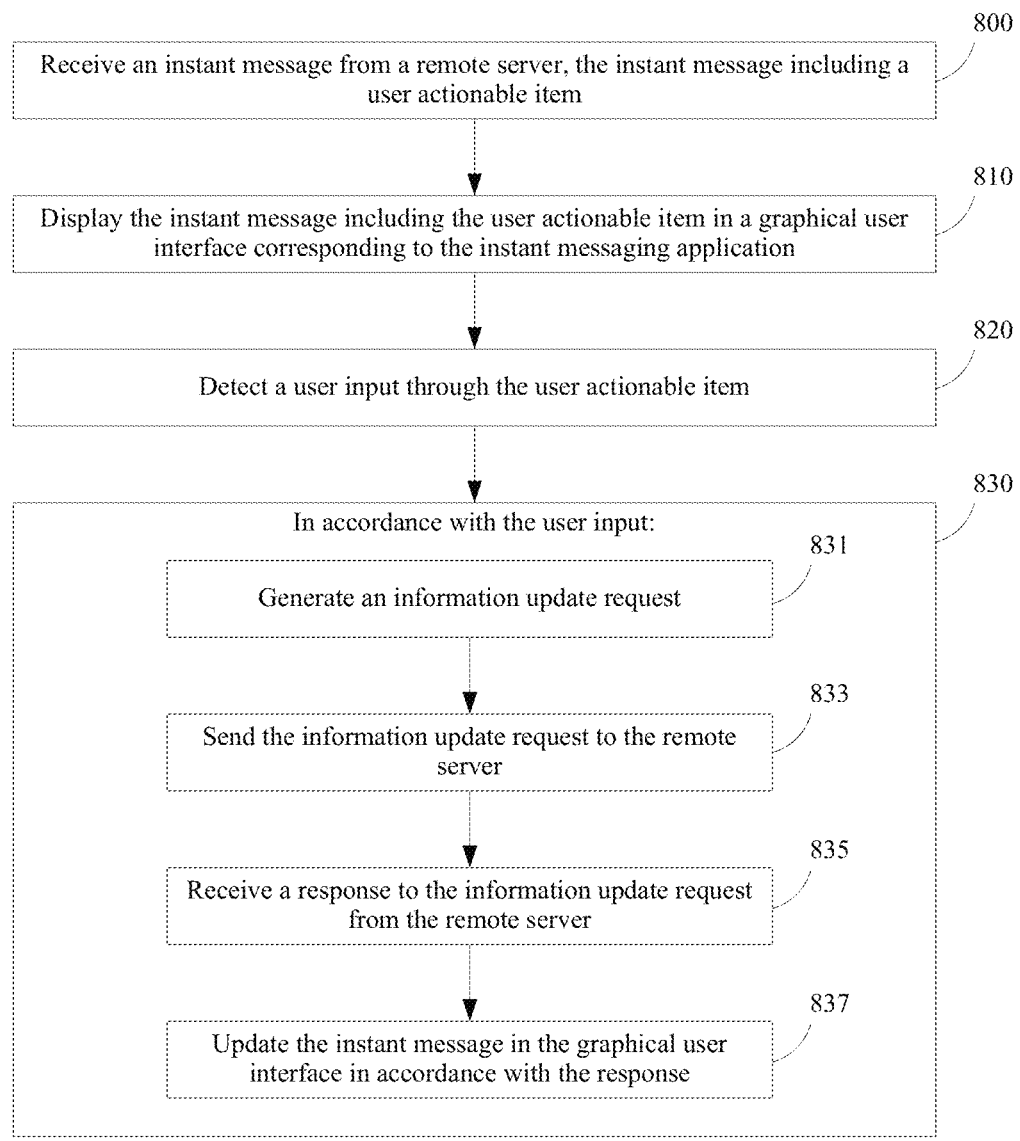
FIG. 8 is a flowchart of a method of updating an IM message according to some embodiments of the present disclosure.

FIG. 8 is a flowchart of a method of updating an IM message according to some embodiments of the present disclosure. As noted above, one objective of the present disclosure is to allow a user of an IM application to interact with an IM message without departing the IM application.

For illustrative purposes, three screenshots of an IM session interface at different stages on the IM terminal 500 depicted in FIGS. 5A to 5C, respectively.

As shown in FIG. 8, the IM terminal 500 (e.g., a smartphone) receives (800) an instant message from a remote server. In some embodiments, the instant message includes a user actionable item, which could be a push button, a dropdown menu, or a hyperlink. After receiving the IM message, the IM terminal 500 displays (810) the instant message including the first user actionable item in a graphical user interface corresponding to the instant messenger application. FIG. 5A depicts an IM session interface 501 rendered on the display of the IM terminal 500. In this example, the IM session interface 501 is a graphical user interface that includes an IM message sent from a public account of the IM application with which a private account of the IM application at the IM terminal 500 is associated. For example, the public account belongs to a movie theater that periodically sends instant messages to subscribers of the public account promoting new movies. In this example, the IM message includes a message body (which is primarily text-based but may include images) including information like title, cast, director, length, synopsis, etc. A user who reviews the message body can learn at least basic information about this movie.

In some embodiments, the IM message shown in the IM session interface 501 also includes an event button (e.g., the "View movie clip" button 513 shown in FIG. 5A). If the user is interested in learning more about the movie, e.g., watching the trailer of the movie, the user can trigger the display of the movie's trailer within the IM application by pressing the "View movie clip" button 513. The IM terminal 500 detects (820) the user input through the user actionable item (the "View movie clip" button 513 in this example). In accordance with the user input, the IM terminal 500 performs (830) one or more operations. For example, the IM terminal 500 generates (831) an information update request and sends (833) the information update request to the remote server. The information update request may include an identifier of the public account responsible for generating and broadcasting the IM message and an identifier corresponding to the user-selected user actionable item, indicating what the user of the IM terminal 500 intends to view.

Subsequently, the IM terminal 500 receives (835) a response to the information update request from the remote server. In some embodiments, the remote server needs collaboration from the user associated with the public account to generate the response. For example, after receiving the information update request, the remote server forwards the information update request to a user of the IM application at another IM terminal. Note that the user at the other IM terminal may be an individual that is responsible for managing the public account or a software application installed on the other IM terminal for responding to the requests from users who receive and interact with the IM message. In this case, the user is responsible for generating a message including, e.g., a hyperlink to the movie trailer requested by the user of the IM terminal 500 and returns the message to the remote server. The remote server then prepares the response to the information update request in accordance with the message from the user at the other IM terminal.

In some other embodiments, the remote server is configured to store the information associated with the public account and it automatically generates and sends IM messages to private accounts of subscribers of the public account at the IM application. In this case, the remote server identifies a user account associated with the instant message (i.e., the public account). The remote server then queries the information associated with the user account and determines a message predefined in the user account as being associated with the information update request. Based on the predefined message, the remote server prepares the response to the information update request and returns the response to the IM terminal 500.

After receiving the response, the IM terminal 500 updates (837) the instant message in the graphical user interface in accordance with the response from the remote server. As shown in FIG. 5B, the message body 511 shown in FIG. 5A is replaced by a small window showing the movie video 517. In some embodiments, the response from the remote server includes a URL identifying the location of the movie trailer. From analyzing the response, the IM terminal 500 (or more specially, the IM application running on the IM terminal 500) determines that the URL identifies a video stream and then invokes a video player for playing the movie trailer. Note that the video player may be a standalone application or a plug-in of the IM application that is capable of playing video streams downloaded from a remote source (e.g., the remote server). Note that the play of the video stream as shown in FIG. 5B is only for illustrative purposes. The new content associated with the response may have different modalities including image, text, audio or video.

In some embodiments, the IM terminal 500 also replaces the first user actionable item (e.g., the "View movie clip" button 513 in FIG. 5A) with a second user actionable item (e.g., the "Purchase ticket" button 515 in FIG. 5B. In this case, because the user has selected the "View movie clip" button 513, there is a good chance that the user may be interested in purchasing a ticket to watch this movie. In other words, the second user actionable item to be shown in the graphical user interface is, at least in part, determined by the user input through the first user actionable item. After the user clicks the second user actionable item (e.g., the "Purchase ticket" button 515), the IM terminal 500 detects the second user input through the user actionable item. In this case, because the user has pressed the "Purchase ticket" button 515, the IM terminal 500 generates a second information update request including information identifying the user of the IM terminal 500 and his/her intent to purchase a ticket to watch this movie.

Next, the IM terminal sends the second information update request to the remote server and then receives a second response to the second information update request. Upon receiving the second response, the IM terminal 500 then updates the instant message in the graphical user interface in accordance with the second response. As shown in FIG. 5C, after the user presses the "Purchase ticket" button 515, the new IM session interface 505 depicts an updated graphical user interface including a new message body 519 indicating that the ticket (e.g., a PDF document including an electronic ticket number) is ready to be sent to the user via email. The user can confirm the purchase of the ticket by pressing the "Confirm" button 521 to complete the commercial transaction. In some embodiments, the remote server or the public account does not provide a new message like the one shown in FIG. 5C because it deems that the user has already approved the transaction by pressing the "Purchase ticket" button 515 in FIG. 5B. In this case, the new message may only suggest that the ticket has been issued by displaying, e.g., a bar code, on the graphical user interface so that the user can present this bar code at the box office of a movie theater to redeem, e.g., a paper ticket. In either case, the remote server performs a transaction by, e.g., retrieving a credit card account associated with the user using the instant messenger application at the mobile device from its database, and submitting a request to the corresponding issuing bank or credit card agency for deducting a certain amount of money from this user's credit card account. In some other embodiments, the remote server may designate another agency for handling the transaction by either forwarding the second information request to the agency or having the second information request sent to the agency directly. By doing so, the user's request may be served more efficiently. In some embodiments, the information associated with the second information update request may be encrypted because it contains more sensitive information (e.g., credit card account information) that should be kept away from potential hackers.

Figure 9:
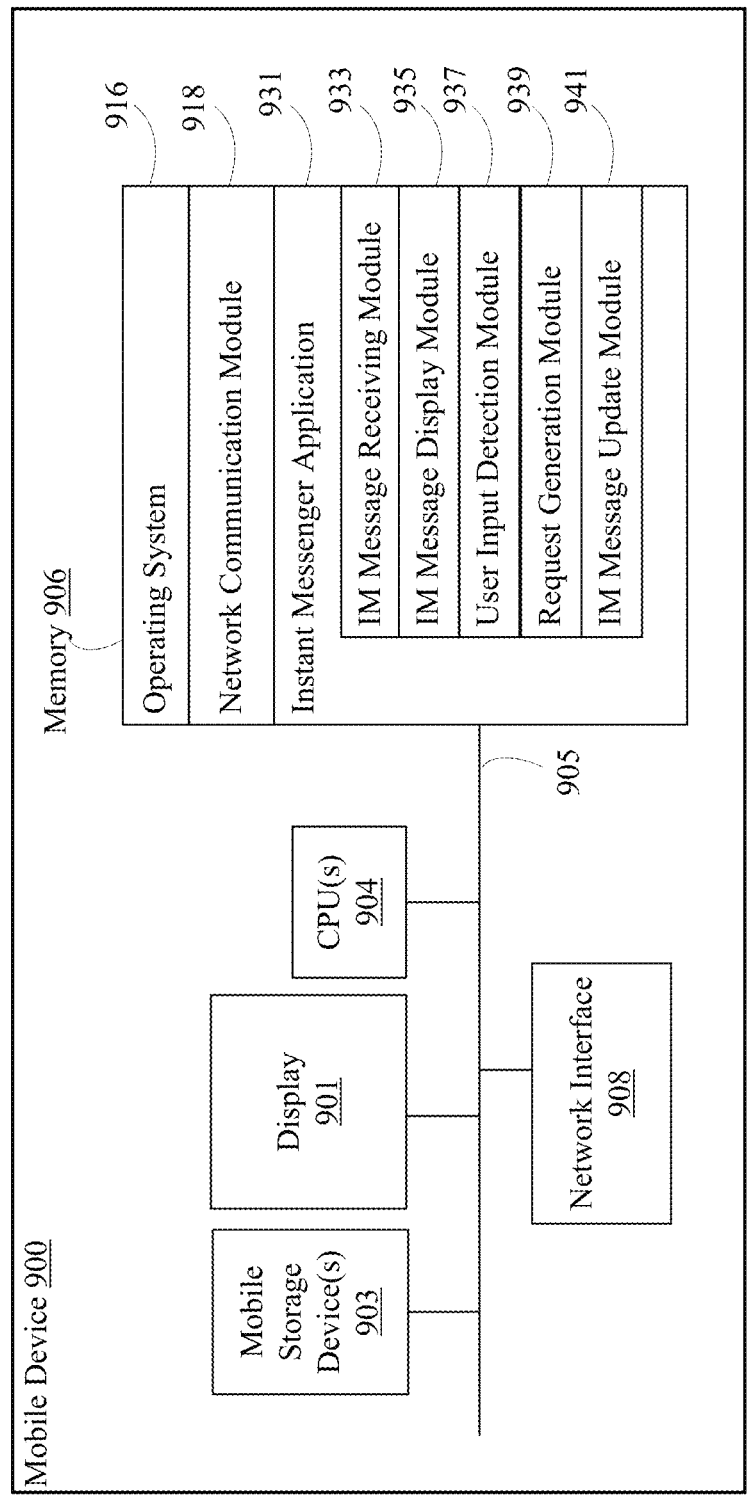
FIG. 9 is a block diagram of a mobile device according to some embodiments of the present disclosure.

FIG. 9 is a block diagram of a mobile device 900 according to some embodiments of the present disclosure. While certain specific features are illustrated, those skilled in the art will appreciate from the present disclosure that various other features have not been illustrated for the sake of brevity and so as not to obscure more pertinent aspects of the implementations disclosed herein.

To that end, the mobile device 900 includes one or more processing units (CPU's) 904, one or more network or other communications interfaces 908, a display 901, memory 906, one or more mobile storage devices 903, and one or more communication buses 905 for interconnecting these and various other components. The communication buses 905 may include circuitry (sometimes called a chipset) that interconnects and controls communications between system components. Memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 may optionally include one or more storage devices remotely located from the CPU(s) 904. Memory 906, including the non-volatile and volatile memory device(s) within memory 906, comprises a non-transitory computer readable storage medium.

In some embodiments, memory 906 or the non-transitory computer readable storage medium of memory 906 stores the following programs, modules and data structures, or a subset thereof including an operating system 916, a network communication module 918, and an instant messenger application 931.

The operating system 916 includes procedures for handling various basic system services and for performing hardware dependent tasks.

The network communication module 918 facilitates communication with other devices via the one or more communication network interfaces 908 (wired or wireless) and one or more communication networks, such as the internet, other wide area networks, local area networks, metropolitan area networks, and so on.

In some embodiments, the instant messenger application 931 includes: an IM message receiving module 933 for receiving IM messages from a remote server or another IM terminal as described above in connection with FIG. 3 (e.g., the message receiving module 340) and FIGS. 5A-5C, respectively; an IM message display module 935 for displaying IM messages on the display 901 of the mobile device 900 as described above in connection with FIG. 3 (e.g., the message display module 350) and FIGS. 5A-5C, respectively; a user input detection module 937 for detecting and interpreting the user input to the mobile device through, e.g., the touch-sensitive display 901, as described above in connection with FIG. 3 (e.g., the operation obtaining module 310) and FIGS. 5A-5C, respectively; a request generation module 939 for generating an information update request to the remote server or the other IM terminal based on the user input and sending the request to the remote server or the other IM terminal as described above in connection with FIG. 3 (e.g., the response message obtaining module 360 and the trigger message sending module 330) and FIGS. 5A-5C, respectively; and an IM message update module 941 for updating the graphical user interface on the display 901 based on the response returned by the remote server or the other terminal as described above in connection with FIG. 3 (e.g., the message display module 360) and FIGS. 5A-5C, respectively.

While particular embodiments are described above, it will be understood it is not intended to limit the present disclosure to these particular embodiments. On the contrary, the present disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present disclosure herein is for the purpose of describing particular embodiments only and is not intended to be limiting of the present disclosure. As used in the description of the present disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments.

However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented method for updating information in an instant messenger application, comprising:
    at a mobile device having one or more processors and memory storing programs to be executed by the one or more processors:
        receiving a sequence of instant messages from a remote server, the instant message belonging to an instant messaging (IM) session between the mobile device and an account to which a user of the mobile device has subscribed, wherein a first instant message of the sequence of instant messages includes a first user actionable item;
        displaying the sequence of instant messages including the first instant message in respective regions of a graphical user interface corresponding to the instant messenger application;
        detecting a first user input through the first user actionable item of the first instant message;
        in accordance with the first user input:
            generating an information update request;
            sending the information update request to the remote server;
            receiving a response to the information update request from the remote server; and
            updating the first instant message in its respective region of the graphical user interface in accordance with the response from the remote server without affecting other instant messages in the sequence displayed in the respective corresponding regions of the graphical user interface, wherein updating the first instant message includes:
                updating content of the first instant message;
                replacing the first user actionable item with a second user actionable item, wherein the second user actionable item is determined by the user input through the first user actionable item;
                identifying a hyperlink to a multimedia content in the response from the remote server, wherein the multimedia content is one selected from the group consisting of image, text, audio and video;
                downloading the multimedia content from a source defined by the link; and
                invoking an application embedded in the instant messenger application to render the multimedia content in the graphical user interface.

2. The computer-implemented method of claim 1, wherein the first user actionable item is one selected from the group consisting of a push button, a dropdown menu, and a hyperlink.

3. The computer-implemented method of claim 1, wherein updating the first instant message in its respective region of the graphical user interface in accordance with the response further includes:
    detecting a second user input through the second user actionable item;
    in accordance with the second user input:
        generating a second information update request;
        sending the second information update request to the remote server;
        receiving a second response to the second information update request; and
        updating the first instant message in its respective region of the graphical user interface in accordance with the second response.

4. The computer-implemented method of claim 3, wherein, in response to the second information update request, the remote server is configured to perform a transaction with a credit card account associated with a user using the instant messenger application at the mobile device.

5. The computer-implemented method of claim 1, wherein the remote server is configured to forward the information update request to a user of the instant messenger application at a remote terminal, receive a message from the remote terminal, the message including information entered by the user through the remote terminal, and prepare the response to the information update request in accordance with the user-entered message.

6. The computer-implemented method of claim 1, wherein the remote server is configured to identify a user account associated with the first instant message, determine a message predefined in the user account as being associated with the information update request, and prepare the response to the information update request in accordance with the predefined message.

7. A mobile device, comprising:
    one or more processors;
    memory; and
    one or more programs stored in the memory and configured for execution by the one or more processors, the one or more programs including instructions for:
        receiving a sequence of instant messages from a remote server, the instant messages belonging to an instant messaging (IM) session between the mobile device and an account to which a user of the mobile device has subscribed, wherein a first instant message of the sequence of instant messages includes a first user actionable item;
        displaying the sequence of instant messages including the first instant message in respective regions of a graphical user interface corresponding to the instant messenger application;
        detecting a first user input through the first user actionable item of the first instant message;
        in accordance with the first user input:
            generating an information update request;
            sending the information update request to the remote server;
            receiving a response to the information update request from the remote server; and
            updating the first instant message in its respective region of the graphical user interface in accordance with the response from the remote server without affecting other instant messages in the sequence displayed in the respective corresponding regions of the graphical user interface, wherein updating the first instant message includes:
                updating content of the first instant messages;
                replacing the first user actionable item with a second user actionable item, wherein the second user actionable item is determined by the user input through the first user actionable item;

identifying a hyperlink to multimedia content in the response from the remote server, wherein the multimedia content is one selected from the group consisting of image, text, audio and video;

downloading the multimedia content from a source defined by the link; and invoking an application embedded in the instant messenger application to render the multimedia content in the graphical user interface.

8. The mobile device of claim 7, wherein the first user actionable item is one selected from the group consisting of a push button, a dropdown menu, and a hyperlink.

9. The mobile device of claim 7, wherein the instruction for updating the first instant message in its respective region of the graphical user interface in accordance with the response further includes instructions for:

detecting a second user input through the second user actionable item;

in accordance with the second user input:

generating a second information update request;

sending the second information update request to the remote server;

receiving a second response to the second information update request; and updating the first instant message in its respective region of the graphical user interface in accordance with the second response.

10. The mobile device of claim 9, wherein, in response to the second information update request, the remote server is configured to perform a transaction with a credit card account associated with a user using the instant messenger application at the mobile device.

11. The mobile device of claim 7, wherein the remote server is configured to forward the information update request to a user of the instant messenger application at a remote terminal, receive a message from the remote terminal, the message including information entered by the user through the remote terminal, and prepare the response to the information update request in accordance with the user-entered message.

12. The mobile device of claim 7, wherein the remote server is configured to identify a user account associated with the first instant message, determine a message predefined in the user account as being associated with the information update request, and prepare the response to the information update request in accordance with the predefined message.

13. A non-transitory computer readable storage medium, storing one or more programs for execution by one or more processors of a mobile device, the one or more programs including instructions for:

receiving a sequence of instant messages from a remote server, the instant messages belonging to an instant messaging (IM) session between the mobile device and an account to which the user of the mobile device has subscribed, wherein a first instant message of the sequence of instant messages includes a first user actionable item;

displaying the sequence of instant messages including the first instant message in respective regions of a graphical user interface corresponding to the instant messenger application;

detecting a first user input through the first user actionable item of the first instant message;

in accordance with the first user input:

generating an information update request;

sending the information update request to the remote server;

receiving a response to the information update request from the remote server; and updating the first instant message in its respective region the graphical user interface in accordance with the response from the remote server without affecting other instant messages in the sequence displayed in the respective corresponding regions of the graphical user interface, wherein updating the first instant message includes:

updating content of the first instant message;

replacing the first user actionable item with a second user actionable item, wherein the second user actionable item is determined by the user input through the first user actionable item;

identifying a hyperlink to multimedia content in the response from the remote server, wherein the multimedia content is one selected from the group consisting of image, text, audio and video;

downloading the multimedia content from a source defined by the link; and invoking an application embedded in the instant messenger application to a render the multimedia content in the graphical user interface.

14. The non-transitory computer readable storage medium of claim 13, wherein the first user actionable item is one selected from the group consisting of a push button, a dropdown menu, and a hyperlink.

* * * * *